(12) United States Patent
Fang (10) Patent No.: US 7,161,256 B2
(45) Date of Patent: Jan. 9, 2007

(54) AUTOMATIC POWER GENERATION LIGHT-IMAGE FAN DEVICE

(76) Inventor: Yi Feng Fang, 4F, No. 5, Alley2, Lane 421, Nan Shan Rd., Chung Ho City, Taipei, Hsien (TW)

(*) Notice: Subject to any disclaimer, the term of this patent is extended or adjusted under 35 U.S.C. 154(b) by 0 days.

(21) Appl. No.: 11/332,328

(22) Filed: Jan. 17, 2006

(65) Prior Publication Data

US 2006/0113796 A1    Jun. 1, 2006

Related U.S. Application Data

(63) Continuation-in-part of application No. 10/994,352, filed on Nov. 23, 2004, now abandoned.

(51) Int. Cl.
*F02B 63/04* (2006.01)
*F03G 7/08* (2006.01)
*G09G 3/14* (2006.01)

(52) U.S. Cl. .................. 290/1 R; 345/39; 362/812
(58) Field of Classification Search .............. 290/1 R, 290/1 D; 310/75 C, 75 B, 73; 340/815.45, 340/815.43, 815.64, 815.52, 815.56, 815.4, 340/332, 326, 321, 815.71; 362/96, 192, 362/812; 345/110, 39
See application file for complete search history.

(56) References Cited

U.S. PATENT DOCUMENTS

| | | | | | |
|---|---|---|---|---|---|
| 3,478,349 | A | * | 11/1969 | Buuck et al. | 341/15 |
| 5,903,224 | A | * | 5/1999 | Reynolds | 340/815.45 |
| 6,175,354 | B1 | * | 1/2001 | Blissett et al. | 345/110 |
| 6,193,384 | B1 | * | 2/2001 | Stein | 362/96 |
| 6,265,984 | B1 | * | 7/2001 | Molinaroli | 340/815.4 |
| 6,480,116 | B1 | * | 11/2002 | Wang | 340/815.53 |
| 6,492,963 | B1 | * | 12/2002 | Hoch | 345/39 |
| 6,588,913 | B1 | * | 7/2003 | Huang | 362/96 |
| 6,923,552 | B1 | * | 8/2005 | Tseng | 362/192 |
| 2004/0042206 | A1 | * | 3/2004 | Luo | 362/192 |
| 2006/0120063 | A1 | * | 6/2006 | Lai | 362/96 |

* cited by examiner

*Primary Examiner*—Julio Gonzalez
(74) *Attorney, Agent, or Firm*—Rosenberg, Klein & Lee (57) ABSTRACT

An automatic power-generation light-image fan device is described. It has a fan motor, a vane set, a circuit board, a programmable chip, an automatic power-generation component, a rectifier filter circuit, a magnetic sensor and a positioning magnet. In this device, the circuit board is mounted on the vanes of the vane set and also has plural light-emitting elements, which are respectively connected to I/O terminals of the programmable chip, and an accommodating room is mounted on an inner surface of the vane set, in which an inner circular surface of the accommodating room is circularly mounted by an inductance coil whose ends are connected to an input terminal of the rectifier filter circuit. Thereby, the light-emitting elements mounted on the fan can be controlled to generate various different twinkling light-image variations and an effect of persistence of vision when the fan motor is rotating.

3 Claims, 12 Drawing Sheets

AUTOMATIC POWER GENERATION LIGHT-IMAGE FAN DEVICE

This application is a Continuation-in-Part of application Ser. No. 10/994,352, filed on 23 Nov. 2004, now abandoned and entitled AUTOMATIC POWER GENERATION LIGHT-IMAGE FAN DEVICE.

BACKGROUND OF THE INVENTION

1. Field of the Invention

The present invention is related to an automatic power generation light-image fan device, and more particularly to a fan device that can control light-emitting elements of the vanes to produce various twinkling light-images, also having an effect of persistence of vision and different light-mixing colors when the fan device is rotating.

2. Description of Related Art

Generally, a common fan does not have a light-emitting decoration or a warning function, and a fan with a light-emitting function is always a heat-dispersing fan, such as, for example, TW patent No. 520149. In this disclosure, several plugging holes are formed in a circular portion of a fan base in an isogonal manner, and light-emitting diodes are correspondingly located in these plugging holes, respectively. Furthermore, these light-emitting diodes are connected to one another in series through printed conducting lines, and the printed conducting lines are also connected in series with the conducting lines of a vane set, so that when the components of the vanes are electrically conducted, the vanes rotate to provide air convection, and simultaneously, because the rotation of the vanes conducts the light-emitting diodes to illuminate and also refracts the light emitted therefrom, the heating-dispersing fan radiates light and has a novel luminous effect.

However, the above-mentioned light-emitting and luminous effects still cannot provide a light-image or color-mixing effects for generating better visual effects. Moreover, the heating-dispersing fan does not have a function of automatic power generation.

SUMMARY OF THE INVENTION

The object of the present invention is to provide a mechanism for making a common fan have an automatic power generation function, and simultaneously, through specific circuit designs, to control the light-emitting elements mounted thereon for producing various twinkling light-image variations so that an effect of persistence of vision and different mixing-colors can be achieved when the fan is rotating.

For achieving the object described above, the applicant proposes an automatic power generation light-image fan device with a novel structure and circuit design, including the following elements. A fan motor has a base and a mandrel mounted on the base.

A connector connected to the base, an axle hole being mounted on the connector for passing there through the mandrel of the fan motor. A positioning magnet mounted on the connector.

A vane is set having a housing base, an axle hole in the housing base for passing there through the mandrel of the fan motor, an accommodating room mounted on an inner surface of the housing base, and plural vanes circularly mounted around the housing base. An automatic power generation component having at least one permanent magnets and an inductance coil which is circularly mounted inside the accommodating room of the vane set at a position corresponding to the permanent magnet, and an axle hole being mounted on the automatic power generation component for passing there through the mandrel of the fan motor. A rectifier filter circuit connected to the automatic power generation component for rectifying and filtering an AC voltage generated by the automatic power generation component so as to obtain a DC voltage. A circuit board is mounted on the vanes of the vane set and has more than one light-emitting element. A programmable chip mounted on the circuit board and respectively connected with the rectifier filter circuit and the those light-emitting elements, wherein when the programmable chip receives the DC voltage output by the rectifier filter circuit, the programmable chip outputs a control of different timings of a waveform so as to trigger those light-emitting elements is accordingly triggered to depend on a control of different timings of a waveform output by the programmable chip for generating to generate various twinkling light-image variations and also an effect of persistence of vision, and wherein between those light-emitting elements, an effect of light-mixing for generating different color variations is also formed. A magnetic sensor connected to the programmable chip for sensing the position of the positioning magnet when the fan motor is rotating, the programmable chip counts the rotational speed of the fan motor in response to the sensing for generating an effect of persistence of vision.

The above-mentioned programmable chip is a single chip having an oscillator, a frequency selector, a ROM, a counter, a pattern memory and a buffer integrated thereon.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Reference is made to FIGS. 1 to 5. An automatic power generation light-image fan device of the present invention includes a fan motor 1, a vane set 2, a circuit board 3, a programmable chip 4, an automatic power generation component 5, a rectifier filter circuit 6, a connector 7, a magnetic sensor 8 and a positioning magnet 9. The fan motor 1 is formed by employing a base 11 with a shaft sleeve for sleeving on a mandrel 12 of silicon steel plates and a rotor and then combining through a bolt set. Because the actions between all these components are well-known in the prior arts, they will not be further discussed here.

Figure 1:
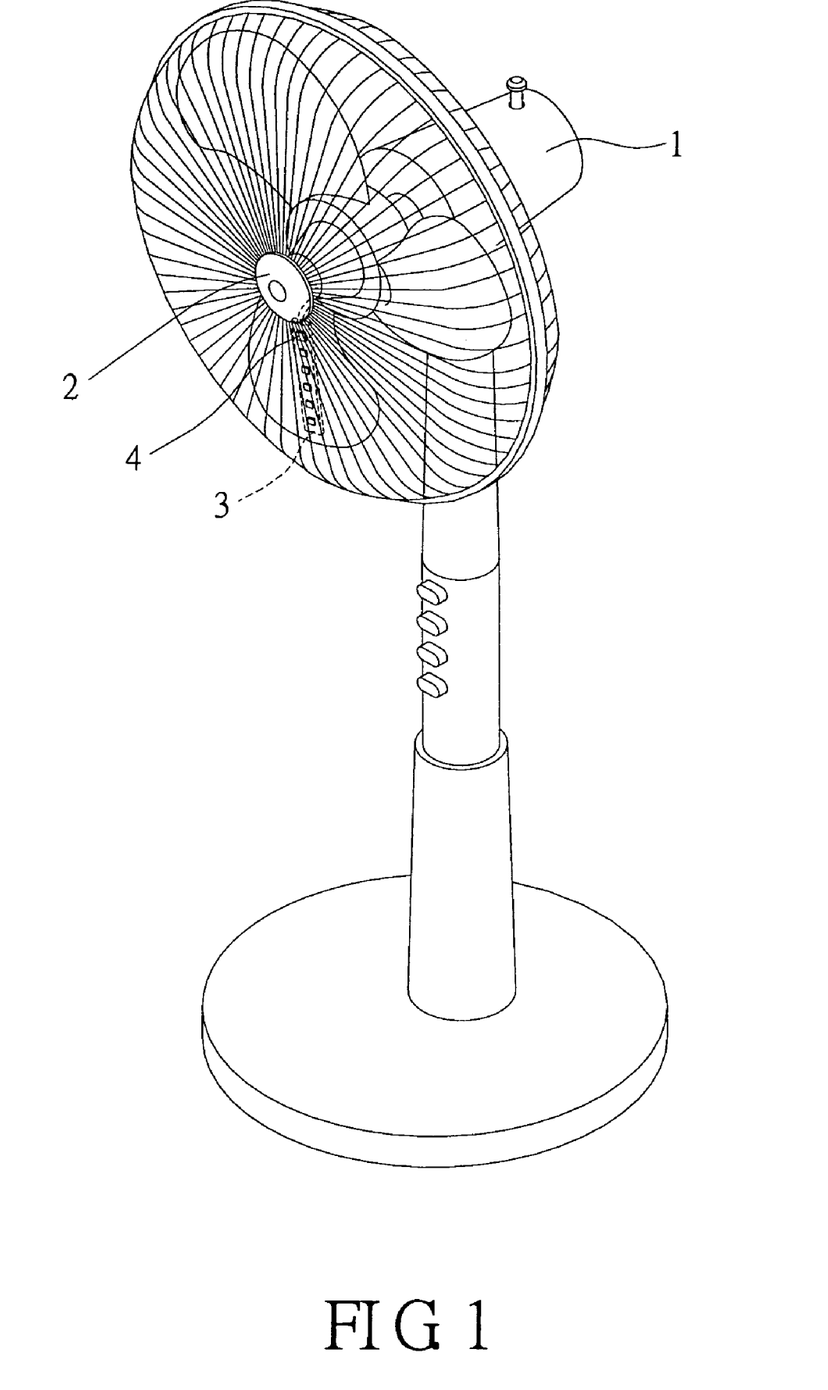
FIG. 1 shows an appearance drawing of the present invention.
Figure 2:
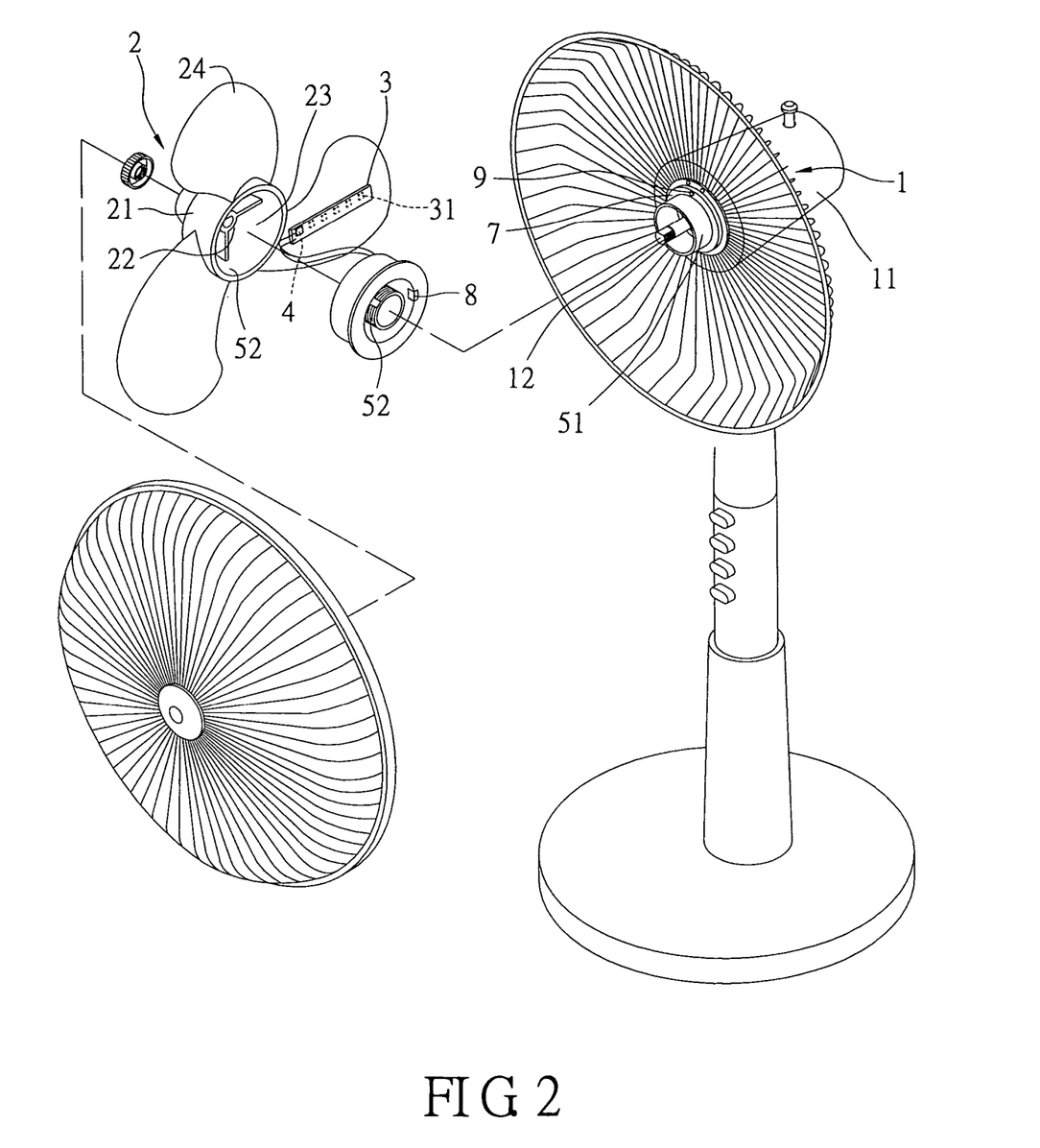
FIG. 2 and FIG. 3 show a decomposition drawing of the present invention.
Figure 3:
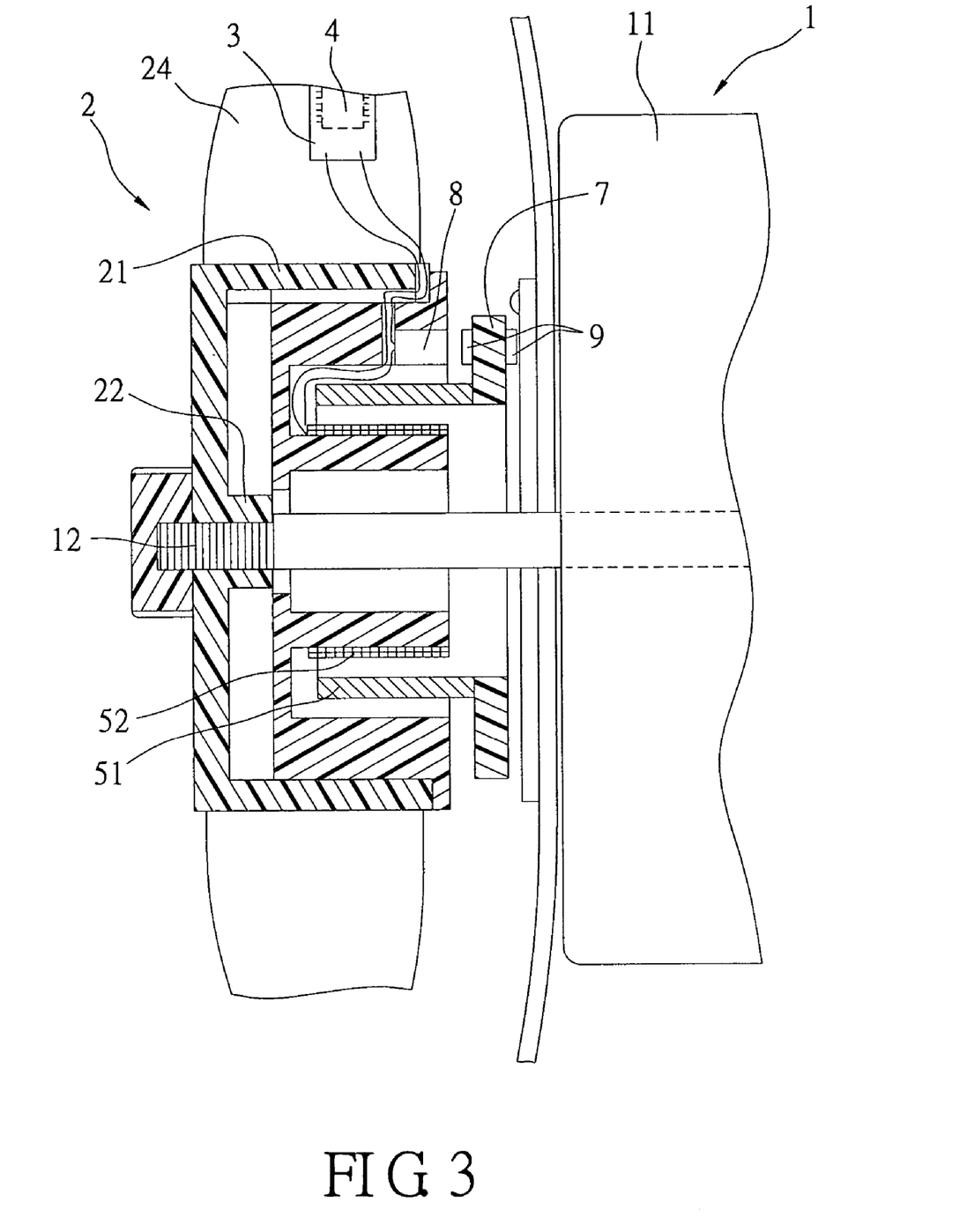

The vane set 2 has an integrally formed housing base (rim) 21 mounted therein in an approximate circular form, and a central portion of the housing base 21 further has an axle hole 22 mounted thereon for passing there through the mandrel 12 of the fan motor 1. Moreover, an accommodating room 23 is formed on an inner surface of the housing base 21 passed through by the mandrel 12, and plural vanes 24 are circularly mounted around the housing base 21.

The circuit board 3 is mounted on the vanes 24 of the vane set 2 and has arranged thereon a plurality of light-emitting elements 31. In a preferred embodiment according to the present invention, there are five light-emitting elements P1–P5 with different colors, each of which is a LED.

Figure 5:
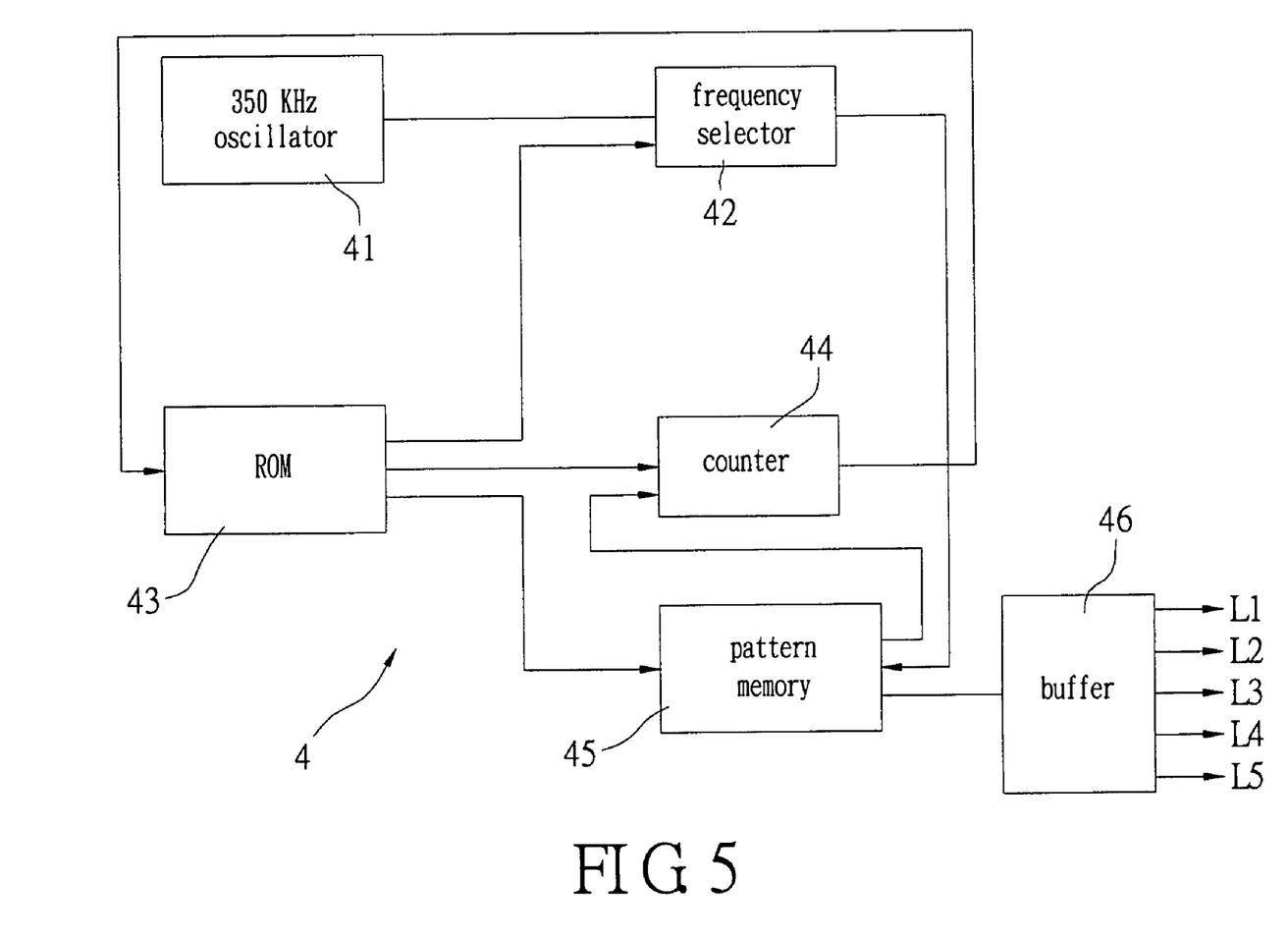
FIG. 5 shows a circuit block of a programmable chip according to the present invention.

Reference is made to FIG. 5, the programmable chip 4 is mounted in the circuit board 3 and is a single chip having a 350 KHz oscillator 41, a frequency selector 42, a ROM 43, a counter 44, a pattern memory 45 and a buffer 46 integrated thereon. Furthermore, the programmable chip 4 also includes a power terminals VDD, VSS and plural I/O terminals L1–L5. Each I/O terminal is respectively connected to those light-emitting element 31. Therefore, when each light-emitting element 31 is driven by the programmable chip 4, it will depend on a control of different timings of the waveform output by the programmable chip 4 and also on different twinkling timings and orders for generating various twinkling light-image variations, as well as an effect of persistence of vision when the fan motor 1 is rotating.

Figure 4:
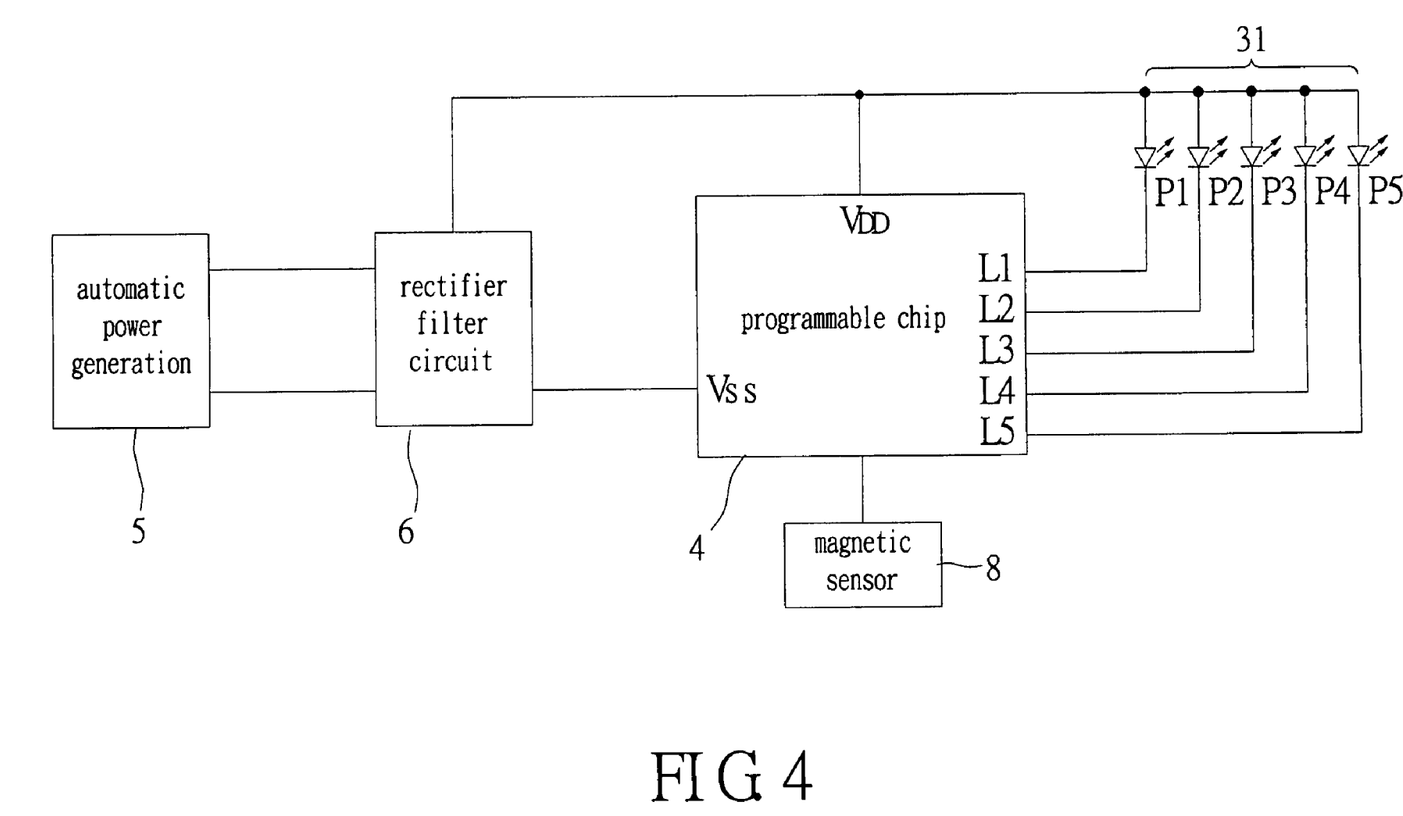
FIG. 4 shows a circuit block of the present invention.

The rectifier filter circuit 6 is connected to the power terminals VDD, VSS of the programmable chip 4 and is composed of a bridge rectifier and a filter capacitance. The rectifier filter circuit 6 can rectify and filter an input AC voltage to obtain a DC voltage for supplying to the programmable chip 4.

The automatic power generation component 5 has one or more permanent magnets 51 and an inductance coil 52 which are circularly mounted inside the accommodating room 23 of the vane set 2 at a position corresponding to the permanent magnet 51. An axle hole (no showed) being mounted on the automatic power generation component 5 for passing there through the mandrel 12 of the fan motor 1.

Figure 6A:
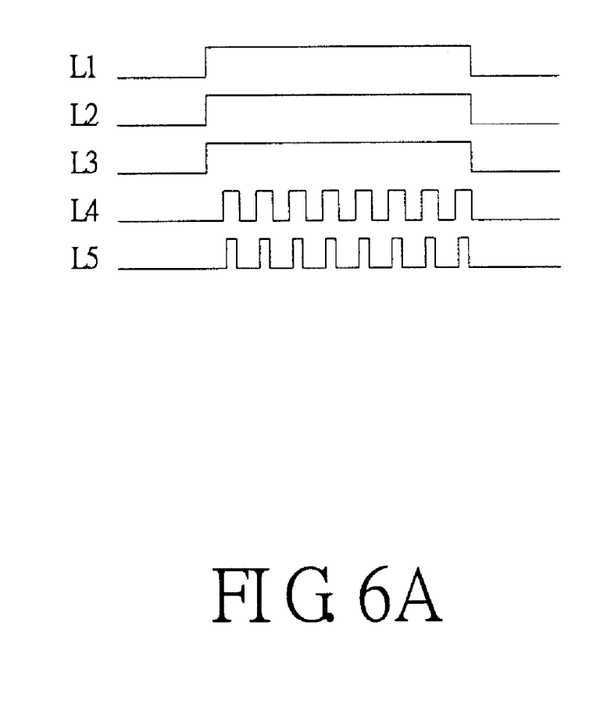
FIG. 6A shows a timing drawing of different frequencies output by the programmable chip to light-emitting elements according to the present invention.
Figure 6B:
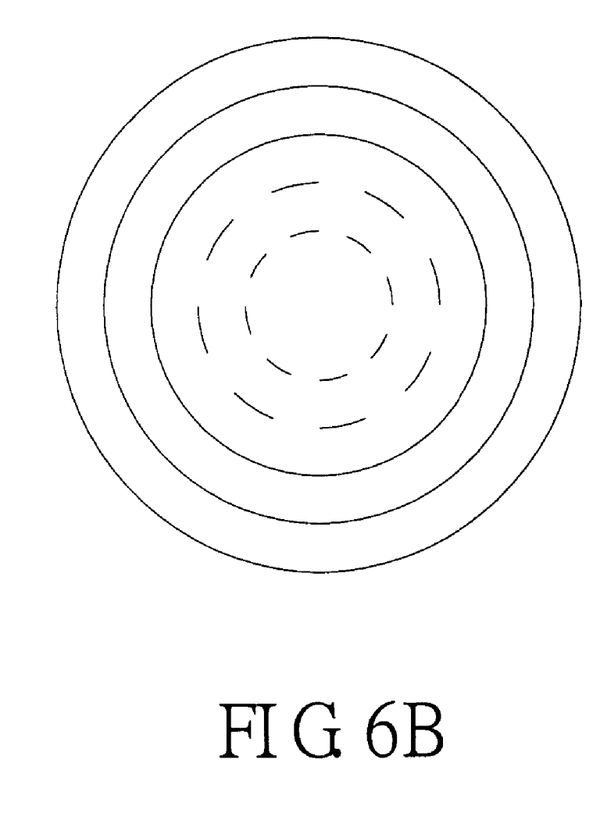
FIG. 6B is a schematic view showing the variation of persistence of vision produced from the timing shown in FIG. 7A when the device of the present invention moves.
Figure 7A:
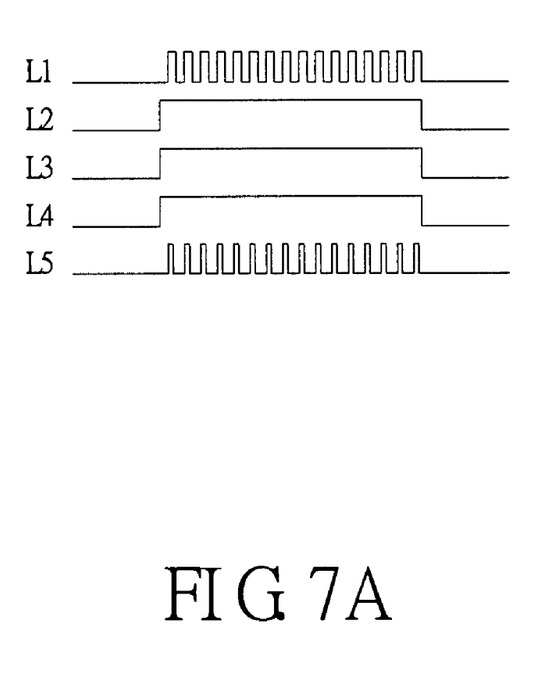
FIG. 7A is another timing drawing of different frequencies output by the programmable chip to light-emitting elements according to the present invention.
Figure 7B:
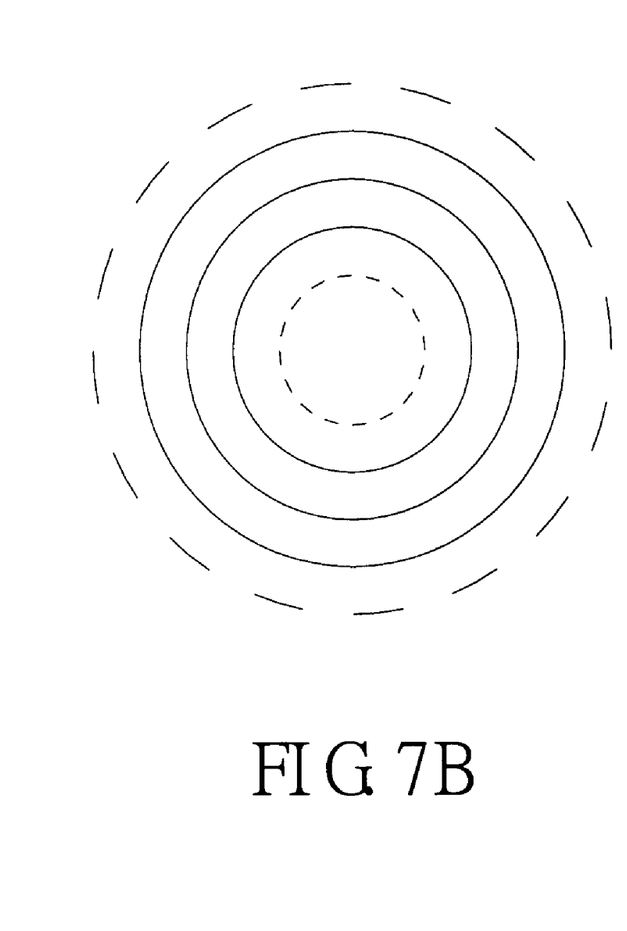
FIG. 7B is a schematic view showing the variation of persistence of vision produced from the timing shown in FIG. 8A when the device of the present invention moves.
Figure 8A:
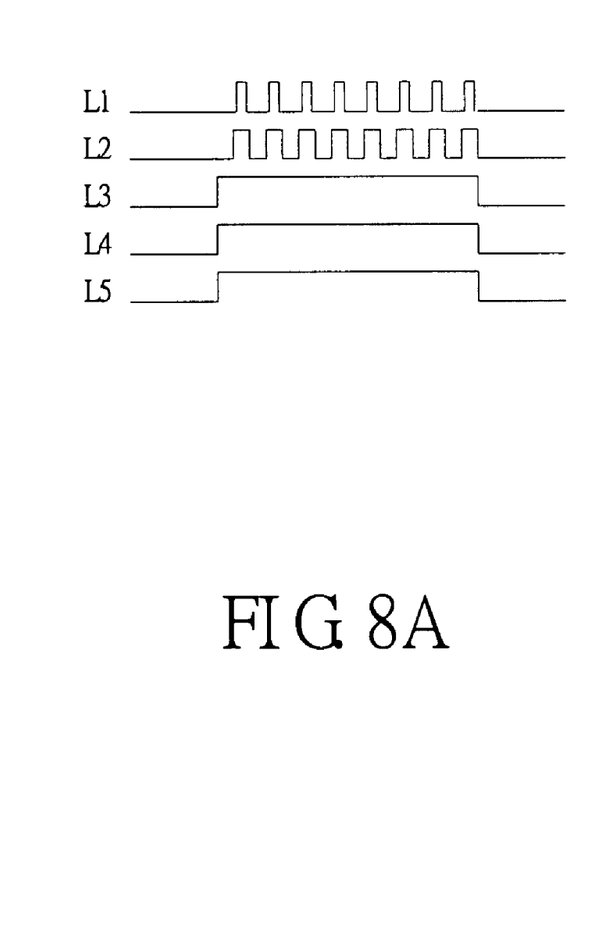
FIG. 8A is another further timing drawing of different frequencies output by the programmable chip to light-emitting elements according to the present invention.
Figure 8B:
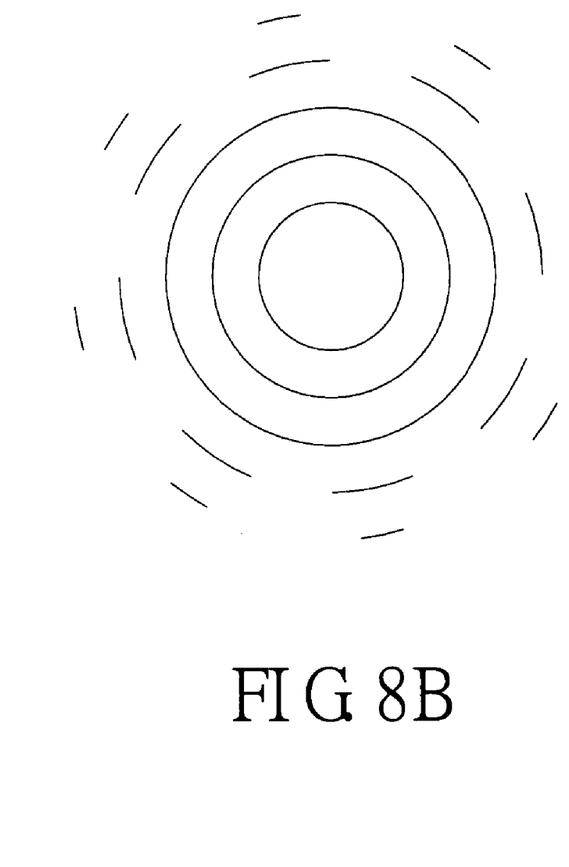
FIG. 8B is a schematic view showing the variation of persistence of vision produced from the timing shown in FIG. 9A when the device of the present invention moves.

In a preferred embodiment according to the present invention, a ring permanent magnet 51 is assembled on the base 11 of the fan motor 1 through a connector 7. Two ends of a continuous conducting line of the inductance coil 52 are connected to an input terminal of the rectifier filter circuit 6 so as to generate an electromotive force through a rotation of the mandrel 12 of the fan motor 1 for supplying to the rectifier filter circuit 6 and obtaining a DC voltage. Moreover, when the programmable chip 4 is functioned, the light-emitting element 31 is triggered so that it depends on a control of different timings of the waveform output by the programmable chip 4, as shown in FIG. 6A, FIG. 7A and FIG. 8A, and also on different twinkling timings and orders for generating various twinkling light-image variations, as well as an effect of persistence of vision, as shown in FIG. 6B, FIG. 7B and FIG. 8B. In addition, between the light-emitting elements 31, it also has an effect of light-mixing for generating different color variations.

Moreover, the embodiment further has a positioning magnet 9 which is mounted on the connector 7; and a magnetic sensor 8 is connected to the programmable chip 4 for sensing the position of the positioning magnet 9 when the fan motor 1 rotates. The programmable chip 4 counts the rotational speed of the fan motor 1 in response to the sensing for generating an effect of persistence of vision (showed in FIG. 9).

Figure 9:
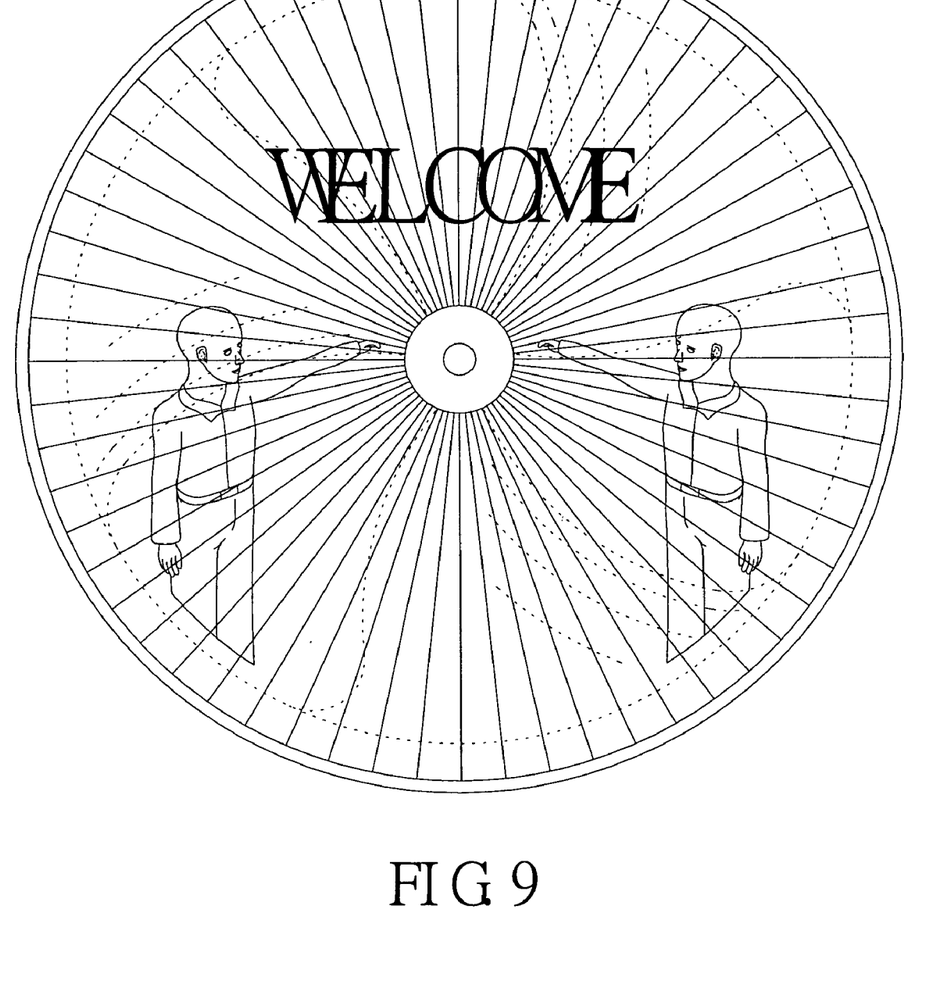
FIG. 9 is a decomposition drawing of the present invention for generating a persistence of vision.

The magnetic sensor 8 senses a magnetic signal when it corresponds to the positioning magnet 9, and the programmable chip 4 determines the rotational speed of the fan motor 1 in response to the magnetic signal. At this time, the light-emitting element 31 is triggered by the programmable chip 4 according to a control of different timings of the waveform outputted from the programmable chip 4. The different timings and orders thereof generate various twinkling light-image variations, as well as an effect of persistence of vision.

Further reference is made to FIG. 6A, which discloses that when the first to the third LEDs P1–P3 are driven by the programmable chip 4 to have a frequency with lasting light and the fourth and the fifth LEDs P4 and P5 have different frequencies, the fan rotates to produce a pattern shown in FIG. 6B.

Further reference is made to FIG. 7A, which discloses that when the second to the fourth LEDs P2–P4 are driven by the programmable chip 4 to have a frequency with lasting light and the first and the fifth LEDs P1 and P5 to have different frequencies, the fan rotates to produce a pattern shown in FIG. 7B.

Further reference is made to FIG. 8A, which discloses that when the third to the fifth LEDs P3–P5 are driven by the programmable chip 4 to have a frequency with lasting light and the first and the second LEDs P1 and P2 to have different frequencies, the fan rotates to produce a pattern shown in FIG. 8B.

Furthermore, the above-mentioned automatic power generation component 5 and the rectifier filter circuit 6 also can be mounted on a suitable portion of the fan motor 1 so that the programmable chip 4 can make the automatic power generation component 5 generate an induced voltage, which is then rectified and filtered by the rectifier filter circuit 6 for obtaining a DC voltage. At this time, the programmable chip 4 triggers the light-emitting element 31 so that the light-emitting element 31 can depend on a control of different timings of the waveform output by the programmable chip 4 and also on different twinkling timings and orders for generating various twinkling light-image variations, as well as an effect of persistence of vision. In addition, between the light-emitting elements 31, it also has an effect of light-mixing for generating different color variations.

Figure 10:
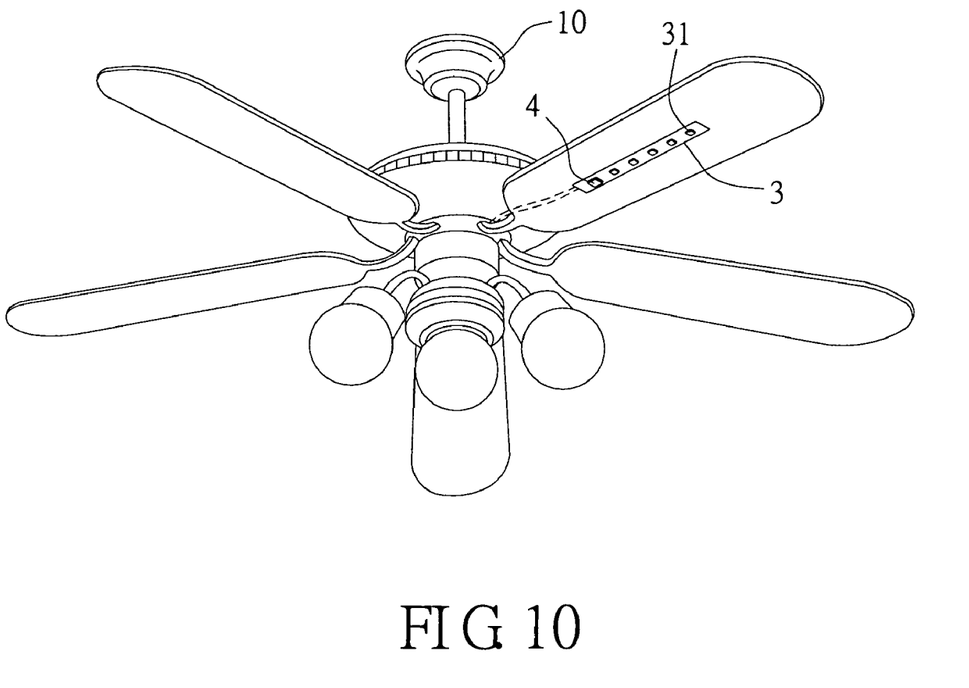
FIG. 10 is a decomposition drawing of a second embodiment according to the present invention.
Figure 11:
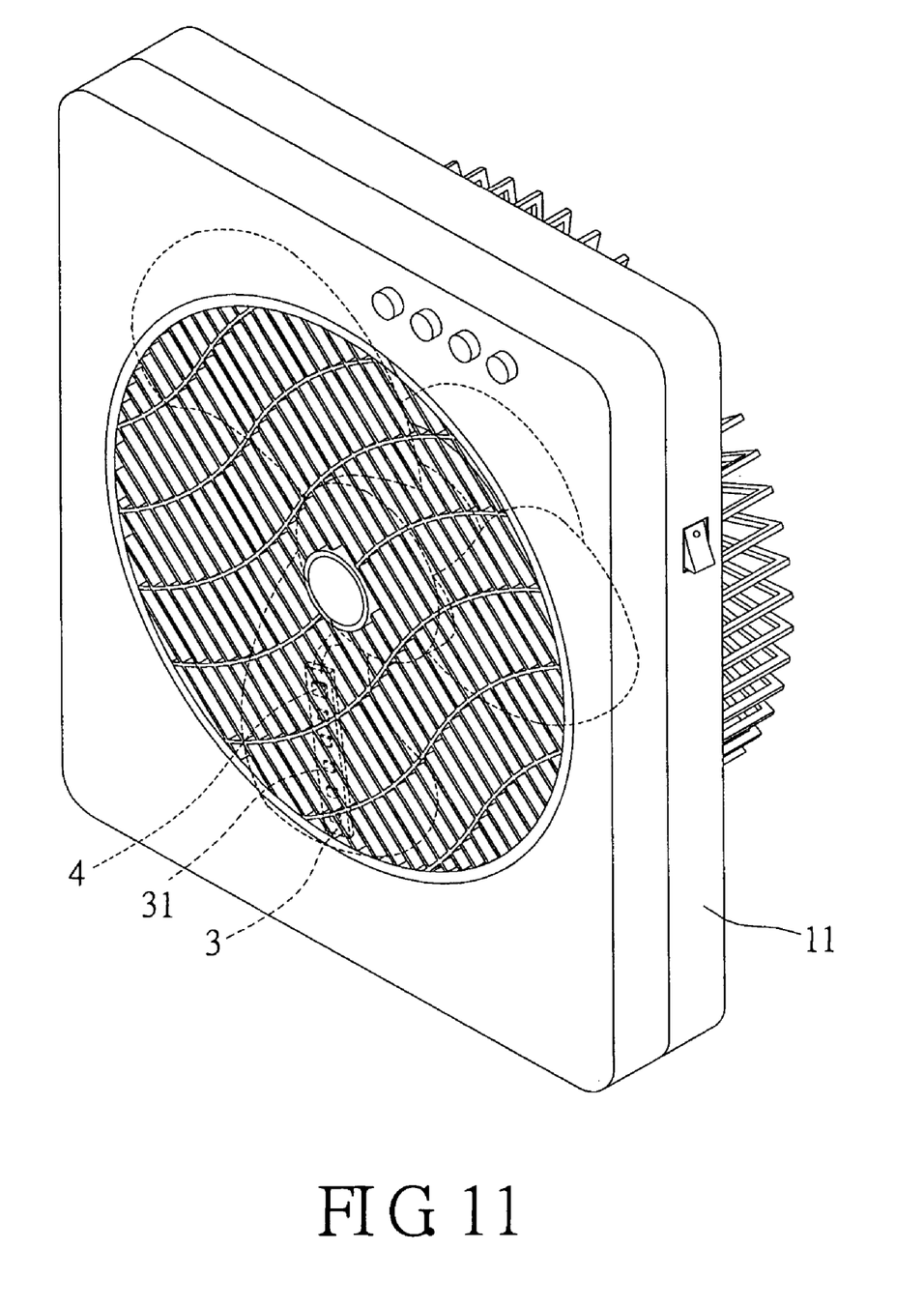
FIG. 11 is an appearance drawing of a third embodiment according to the present invention.
Figure 12:
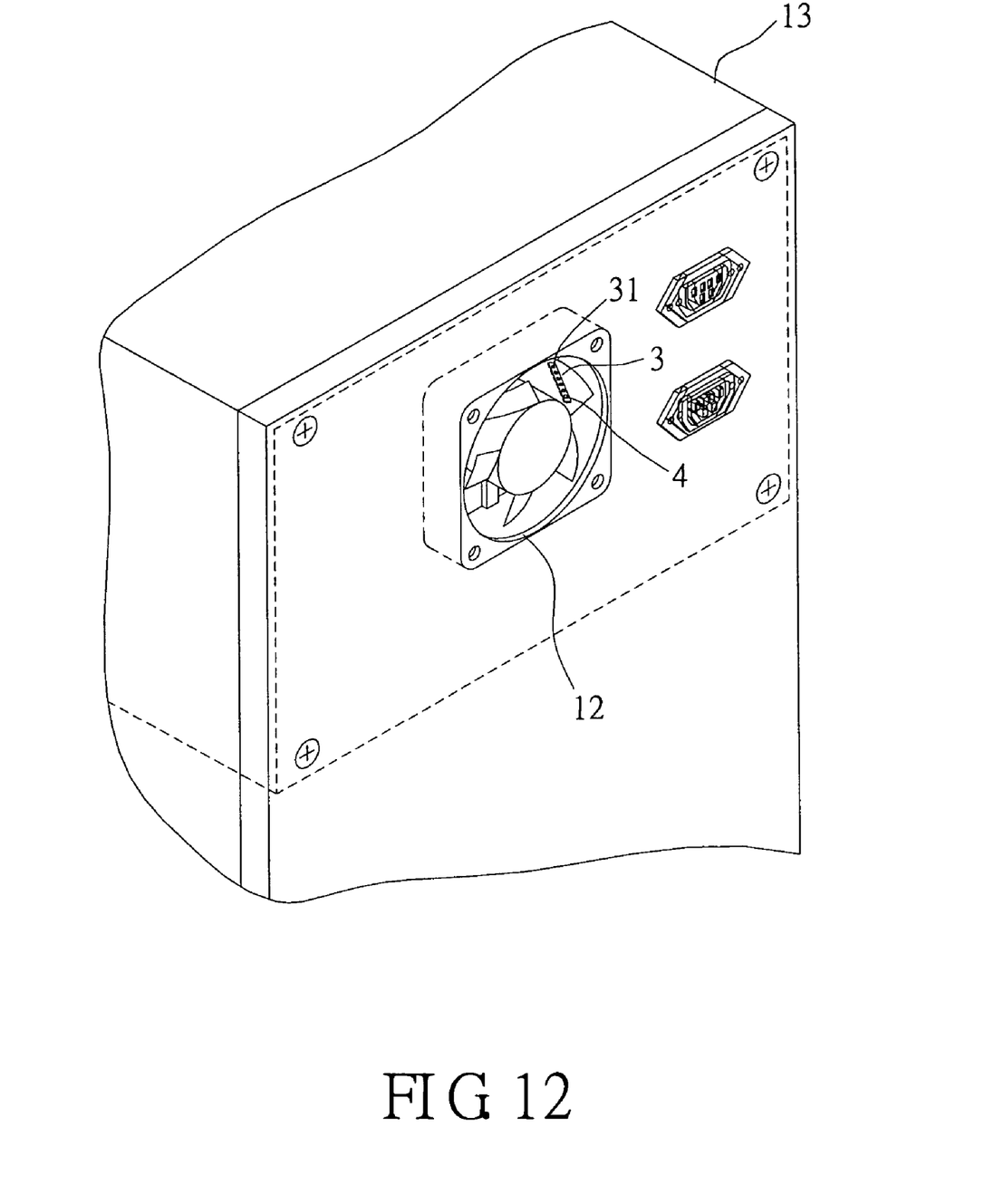
FIG. 12 is an appearance drawing of a fourth embodiment according to the present invention.

Besides, the circuit board 3, the light-emitting elements 31, the rectifier filter circuit 6, the programmable chip 4 and the automatic power generation component 5 according to the present invention are also suitable for application to a ceiling fan 10, a standing fan 11, or a transparent computer case 13 with a heat dispersing fan 12, as shown in FIG. 10, FIG. 11 and FIG. 12, respectively. As can be seen from the above, through the novel structure and circuit design of the present invention, the light-emitting elements mounted on the fan can be controlled to generate various twinkling light-image variations and also an effect of persistence of vision. Moreover, between the light-emitting elements, it also can have an effect of light-mixing for generating different color variations which is totally different from the prior art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An automatic power-generating light-image fan device, comprising:
   a fan motor having a base and a mandrel mounted on the base;
   a connector connected to the base, an axle hole being mounted on the connector for passing there through the mandrel of the fan motor;
   a positioning magnet mounted on the connector;
   a vane set having a housing base, an axle hole being mounted on the housing base for passing there through the mandrel of the fan motor, an accommodating room mounted on an inner surface of the housing base and plural vanes circularly mounted around the housing base;
   an automatic power generation component having at least one permanent magnets and an inductance coil which is circularly mounted inside the accommodating room of the vane set at a position corresponding to the permanent magnet, and an axle hole being mounted on the automatic power generation component for passing there through the mandrel of the fan motor;
   a rectifier filter circuit connected to the automatic power generation component for rectifying and filtering an AC voltage generated by the automatic power generation component so as to obtain a DC voltage;
   a circuit board mounted on the vanes of the vane set and having more than one light-emitting element;
   a programmable chip mounted on the circuit board and respectively connected with the rectifier filter circuit and those light-emitting elements, wherein when the programmable chip receives the DC voltage output by the rectifier filter circuit, the programmable chip outputs a control of different timings of a waveform so as to trigger those light-emitting elements to generate various twinkling light-image variations and also an effect of persistence of vision, and wherein between those light-emitting elements, an effect of light-mixing for generating different color variations is also formed; and
   a magnetic sensor, connected to the programmable chip for sensing the position of the positioning magnet when the fan motor rotates, moreover the programmable chip counts the rotational speed of the fan motor in response to the sensing for generating an effect of persistence of vision.

2. The device according to claim 1, wherein the programmable chip is a single chip having an oscillator, a frequency selector, a ROM, a counter, a pattern memory and a buffer integrated thereon.

3. The device according to claim 2, wherein the programmable chip comprises a power terminal, a trigger terminal and plural I/O terminals, the power terminal being connected to an output terminal of the rectifier filter circuit and the plural I/O terminals being respectively connected to a light-emitting element.

* * * * *